United States Patent [19]

Kiwaki et al.

[11] 4,163,191
[45] Jul. 31, 1979

[54] MAGNETIC PHASE SHIFTER CONTROL SYSTEM

[75] Inventors: Hisakatsu Kiwaki; Hiroshi Narita; Hiroshi Sato, all of Katsuta, Japan

[73] Assignee: Hitachi, Ltd., Japan

[21] Appl. No.: 825,042

[22] Filed: Aug. 16, 1977

[30] Foreign Application Priority Data

Sep. 3, 1976 [JP] Japan .................................. 51-104896

[51] Int. Cl.$^2$ ............................ H02P 5/16; H02P 5/18
[52] U.S. Cl. .................................. 323/89 M; 318/139; 323/22 SC; 330/8
[58] Field of Search ........... 318/139, 246, 341, 345 C, 318/599; 323/22 SC, 34, 89 R, 89 M; 330/8, 63

[56] References Cited

U.S. PATENT DOCUMENTS

| | | |
|---|---|---|
| 2,691,756 | 10/1954 | Schaelchlin et al. ............. 323/89 M |
| 2,985,811 | 5/1961 | Quintino et al. .................. 323/89 M |
| 3,903,465 | 9/1975 | Ibamoto et al. .................. 318/139 X |
| 4,032,833 | 6/1977 | Ibamoto et al. .................... 323/89 M |

Primary Examiner—A. D. Pellinen
Attorney, Agent, or Firm—Craig and Antonelli

[57] ABSTRACT

A magnetic phase shifter control system comprises a magnetic phase shifter for producing an output signal in accordance with a control command at a predetermined amplification degree, a circuit for suppressing the output signal of the magnetic phase shifter to a level lower than a predetermined level on command, and a circuit for reducing the amplification degree of the magnetic phase shifter when the suppressing circuit is operative, whereby a delay for response due to a dead time which the magnetic phase shifter inherently has is eliminated.

17 Claims, 13 Drawing Figures

MAGNETIC PHASE SHIFTER CONTROL SYSTEM

LIST OF PRIOR ART REFERENCES

The following references are cited to show the state of the art:
U.S. Pat. No. 3,914,672 H. Kiwaki & et al Oct. 21, 1975, 318/246; 318/341
Japanese Patent Publication No. 37-6075 HITACHI, LTD., June 26, 1962
Article of Paper No. 831 of the 1963 Joint Conference of four Electrical Associations of Japan, entitled "Time Delay Utilizing a Jump of a Magnetic Amplifier", Hajime Yamada & et al.

BACKGROUND OF THE INVENTION

1. Field of the Invention

The present invention relates to a magnetic phase shifter control system, and more particularly to a magnetic phase shifter control system suited to construct an automatic control system.

2. Description of the Prior Art

Magnetic phase shifters have been widely used in an automatic control system for main motors of vehicles, e.g. thyristor controlled electrical vehicle, because they have many advantageous features. For example, they are simple and strong in construction, they can add and subtract a number of control inputs while they are isolated from each other, they can amplify and convert a signal resulting from the addition and the subtraction into a phase shifting signal, and they are not easily influenced by noise.

By way of example, U.S. Pat. No. 3,914,672 entitled "Chopper Control System" discloses a system in which a magnetic phase shifter is used to control a chopper which in turn drives a D.C. motor of the electric vehicle or the like. The magnetic phase shifter used therein includes a saturable core, a control winding to which a current command for the D.C. motor is applied, a feedback winding to which a current of the D.C. motor is fed back, a bias winding to which a predetermined biasing signal is applied, a shorting winding for stabilizing the characteristic, an output winding for producing a signal having a phase in accordance with the current command, and an A.C. power supply for exciting the output winding. The magnetic phase shifter controls a duty factor of the chopper in accordance with the current command. It presents no particular inconvenience so long as it is operated in a normal amplification region.

However, where the magnetic phase shifter is to be operated while shifting the operation region thereof from a remanent output region to the normal amplification region, it presents inconvenience. Namely, when the operating region is shifted from the remanent output region to the normal amplification region, a dead time occurs at the boundary. Here, the "dead time" means a phenomenon in which an output cannot follow an input and there occurs a time delay before a normal output is produced.

It is known that the higher the amplification degree in the normal amplification region is and the larger the shorting effect of the shorting winding is, the longer is the dead time. For example, the Japanese Patent Publication No. 37-6075 published in June 26, 1962 and entitled "Method for Selecting Cores for Magnetic Amplifier" includes description on page 1, left column, lines 6 to 11, which suggests that the larger the amplification degree is, the larger is the dead time, and the article of the paper No. 831 of the 1963 Joint conference of Four Electrical Associations of Japan, entitled "Time Delay Utilizing a Jump of A Magnetic Amplifier" includes description in a preamble thereof which suggests that the larger the shorting effect of the shorting winding is, the larger is the dead time.

SUMMARY OF THE INVENTION

It is an object of the present invention to provide a magnetic phase shifter control system which is not affected by the dead time.

A feature of the present invention lies in a magnetic phase shifter control system which comprises a magnetic phase shifter for producing an output signal in accordance with a control command at a predetermined amplification degree, a first means for suppressing the output signal of the magnetic phase shifter to a level lower than a predetermined level, and a second means for changing the amplification degree of the magnetic phase shifter when the first means is operative, whereby the amplification degree is lowered when the magnetic phase shifter is operated near the boundary between the remanent output region and the normal amplification region for eliminating the effect of the dead time.

Other objects, features and advantages of the present invention will be apparent from the description of the preferred embodiments of the invention taken in conjunction with the accompanying drawings.

DESCRIPTION OF THE PREFERRED EMBODIMENTS

Figure 1:
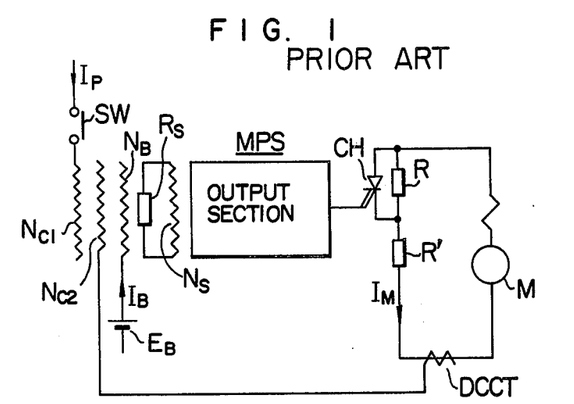
FIG. 1 shows an example of a configuration which uses a magnetic phase shifter to control a braking current for a chopper type electrical vehicle, for illustrating inconvenience encountered in a prior art magnetic phase shifter control system.

FIG. 1 shows an example of a configuration which uses a magnetic phase shifter to control a braking current for a chopper type electrical vehicle, for explaining the inconvenience encountered in a prior art magnetic phase shifter control system. A chopper and an output section of the magnetic phase shifter are shown in simplified form.

In FIG. 1, a target braking current $I_p$ is applied to a control winding $N_{cl}$ of the magnetic phase shifter MPS through a switch SW, and a braking current $I_M$ which is detected by a D.C. current transformer DCCT is applied to a control winding $N_{c2}$ in a differential manner with respect to the target current $I_p$. Braking resistors R and R' are connected to a main motor M and a chopper CH is connected in parallel with the resistor R. A gate of the chopper CH is controlled by the magnetic phase shifter MPS so that the dynamic braking current $I_M$ flowing from the main motor M is controlled. $N_s$ denotes a shorting winding wound on the magnetic phase shifter MPS for stabilizing the current control system, $R_s$ denotes a shorting resistor, $N_B$ denotes a bias winding for establishing an operation point of the magnetic phase shifter, $I_B$ denotes a bias current and $E_B$ denotes a bias voltage supply.

Figure 2:
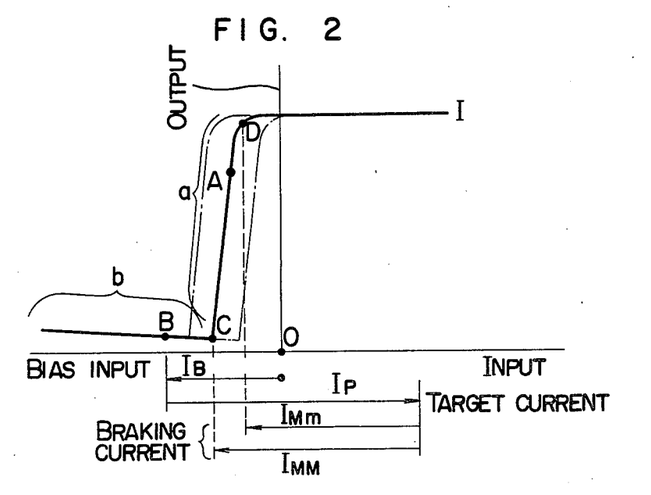
FIG. 2 illustrates the characteristic of the magnetic phase shifter.

The magnetic phase shifter utilizes a phase of an output of a magnetic amplifier, and it is known that the control characteristic thereof is generally shown by a curve I in FIG. 2 when no signal is applied to the biasing winding $N_B$. In FIG. 2, a denotes a normal amplification region and b denotes a remanent output region.

In accordance with the characteristic curve I shown in FIG. 2, an output of the magnetic phase shifter MPS would be nearly maximum even when a control input is zero. This is a very inconvenient characteristic for practical use. Accordingly, means must be provided to suppress the output sufficiently when the control input is zero. Whereas, the characteristic of the magnetic phase shifter MPS is greatly influenced by an exciting current characteristic of a core involved, and when an exciting current changes by the influence of an A.C. power supply or a surrounding temperature, the characteristic of the magnetic phase shifter MPS changes to either side of the curve I of FIG. 2 as shown by dot and dash lines therein. Accordingly, in order to assure positive suppression of the output in spite of such change, the prior art magnetic phase shifter includes the biasing winding $N_B$ through which the bias current $I_B$ flows so that the output of the magnetic phase shifter MPS is taken at a point B, for example, in the remanent output region for the curve I of FIG. 2.

When it is required to supply the braking current $I_M$ to the main motor M, the switch SW is closed to apply the target current $I_p$ to the control winding $N_{cl}$. Upon application of the target current $I_p$, the output of the magnetic phase shifter MPS becomes maximum so that the braking current $I_M$ may flow. Then, the operation point of the magnetic phase shifter MPS balances, for example, at a point A in FIG. 2. That is, the operation point of the magnetic phase shifter MPS is shifted from the remanent output region to the normal amplification region upon application of the target current $I_p$.

When the braking current $I_M$ tends to decrease by the change in the speed of the electrical vehicle, the output of the magnetic phase shifter MPS increases, and when the braking current $I_M$ tends to increase, the output of the magnetic phase shifter MPS decreases. In any case, the magnetic phase shifter MPS operates to suppress the change in the braking current $I_M$.

Since the suppression function occurs when the output of the magnetic phase shifter MPS is in the normal amplification region, that is, between points C and D in FIG. 2, the braking current $I_M$ changes between $I_{MM}$ and $I_{Mm}$. Thus, the higher the amplification degree of the magnetic phase shifter MPS in the normal amplification region is, the smaller is a difference between $I_{MM}$ and $I_{Mm}$, that is, the more closely is the braking current $I_M$ controlled to the target current $I_p$.

On the other hand, it is known that the magnetic phase shifter MPS generally exhibits a dead time when the operation point thereof shifts from the remanent output region to the normal amplification region, that is, when it moves past the boundary point C in FIG. 2. The higher the amplification degree of the magnetic phase shifter in the normal amplification region is and the larger the shorting effect of the shorting winding is, the larger is the dead time. Whereas, it is apparent from the control operation described above that the higher accuracy for the braking current $I_M$ is to be attained in the control system shown in FIG. 1, the higher amplification degree must be given to the magnetic phase shifter MPS. However, since it is the general nature of an automatic control system that the higher the amplification degree is, the more unstable is the system. Accordingly, in order to stabilize the system, the shorting effect must be enhanced by increasing the number of turns of the shorting winding $N_s$ or reducing the resistance of the shorting resistor $R_s$, for increasing the time constant of the magnetic phase shifter MPS.

Thus, the higher the accuracy of the control desired is, the larger is the shorting effect and hence the larger is the dead time. As a result, a longer time is needed before the braking current $I_M$ starts to flow after the application of the target current $I_p$. Therefore, a time delay before the braking current $I_M$ reaches a predetermined level increases making it difficult to smoothly control the electrical vehicle.

In the electrical vehicle, from a viewpoint of improvement of the feeling of a comfortable ride and the prevention of gliding, a so-called soft-start in which the braking current is gradually increased from zero is required, and the magnitude of the target current $I_p$ is also changed gradually from zero to a final level. In the prior art system shown in FIG. 1, however, even when the target current $I_p$ gradually increases from zero, the braking current $I_M$ remains zero so long as the operation point of the magnetic phase shifter MPS is in the remanent output region, and when the operating point of the magnetic phase shifter MPS shifts to the normal amplification region after the elapse of the dead time, the braking current $I_M$ suddenly changes from zero to a large value to follow the target current $I_p$ which, at this time, has reached a high level. Accordingly, a soft-start cannot be attained.

When the magnetic phase shifter is operated under an overexcited condition, a remanent output may increase to a level comparable to a normal output or the linearity of the amplification characteristic may be lost. Therefore, it is a usual practice to operate the magnetic phase shifter under an underexcited condition so that it is not overdriven even when the power supply voltage changes. However, the dead time increases when the magnetic phase shifter is operated under the underexcited condition. This further makes it difficult to smoothly control the electrical vehicle.

The present invention intends to provide a magnetic phase shifter control system which overcomes the inconveniences caused by the dead time. The present invention will now be explained in detail in conjunction with the preferred embodiments.

Figure 3:
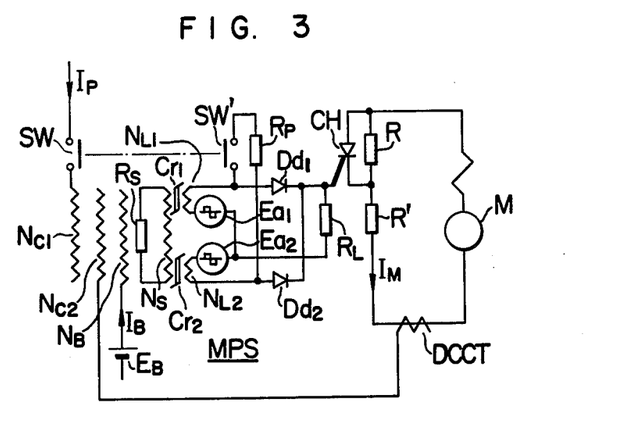
FIG. 3 shows a configuration for illustrating one embodiment of a magnetic phase shifter control system of the present invention.

FIG. 3 shows a configuration of one embodiment of the magnetic phase shifter control system of the present invention, in which the braking current for the chopper type electrical vehicle is controlled as in the case of FIG. 1.

In FIG. 3, the magnetic phase shifter MPS including saturable cores $C_{r1}$ and $C_{r2}$ has output windings $N_{L1}$ and $N_{L2}$ which are excited by A.C. power supplies $E_{a1}$ and $E_{a2}$, and the currents of the output windings $N_{L1}$ and $N_{L2}$ are supplied to a load resistor $R_L$ through positive feedback rectifiers $D_{d1}$ and $D_{d2}$. A target braking current $I_p$ is supplied to a control winding $N_{c1}$ of the magnetic phase shifter MPS through a switch SW, and a braking current $I_M$ which is detected by a D.C. current transformer DCCT is supplied to a control winding $N_{c2}$ in a differential manner with respect to the target current $I_p$. Braking resistors R and R' are connected to a main motor M and a chopper CH is connected in parallel with the resistor R. A gate of the chopper CH is controlled by the magnetic phase shifter MPS so that the dynamic braking current $I_M$ from the main motor M is controlled.

As in FIG. 1, the magnetic phase shifter MPS includes a shorting winding $N_s$ and a shorting resistor $R_s$, and a biasing current $I_B$ is supplied to a biasing winding $N_B$ from a bias voltage supply $E_B$.

A difference from the configuration of FIG. 1 resides in that a switch SW' is provided, which is linked to the switch SW such that it operates in opposite manner to the switch SW, and a resistor $R_p$ is connected across rectifiers $D_{d1}$ and $D_{d2}$ through the switch SW'.

In this configuration, when the target current $I_p$ is not supplied, that is, when the switch SW is open, the switch SW' is closed and the resistor $R_p$ is connected across the rectifiers $D_{d1}$ and $D_{d2}$. This is equivalent to the reduction of the backward resistances of the rectifiers $D_{d1}$ and $D_{d2}$, as a result, a positive feedback is weakened and, in effect, a negative feedback is applied so that the amplification degree of the magnetic phase shifter MPS decreases as the resistance of the resistor $R_p$ decreases, compared with the characteristic of the prior art (curve I of FIG. 4). This is shown in FIG. 4.

When the switch SW is then closed to supply the target current $I_p$, the switch SW' is opened and the resistor $R_p$ is isolated. As a result, the characteristic of the magnetic phase shifter MPS is shifted from curve II back to curve I in FIG. 4 and the automatic control of the braking current $I_M$ is thereafter attained in a manner similar to that explained in FIG. 2. In this case, because of the delay of operation due to the action of the shorting winding $N_s$, the amplification degree of the magnetic phase shifter MPS does not instantaneously move back to the value corresponding to the curve I in FIG. 4, but moves gradually. During this period, the magnetic phase shifter MPS is driven by the target current $I_p$ from the remanent output region to the normal amplification region and passes through the boundary point C. At this time, the amplification degree of the magnetic phase shifter MPS is still low. Therefore, by virtue of the general nature of the magnetic phase shifter, that is, the nature that the lower the amplification degree is the smaller is the dead time, the dead time required in passing through the point C is much smaller than that in the prior art system. Accordingly, the smooth control of the braking current and hence the smooth control of the electrical vehicle can be attained.

Figure 4:
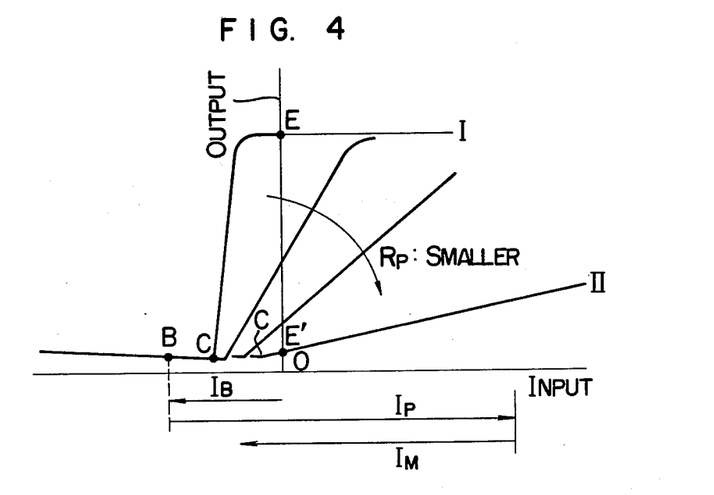
FIG. 4 illustrates the characteristic of the magnetic phase shifter used in the configuration shown in FIG. 3.
Figure 5:
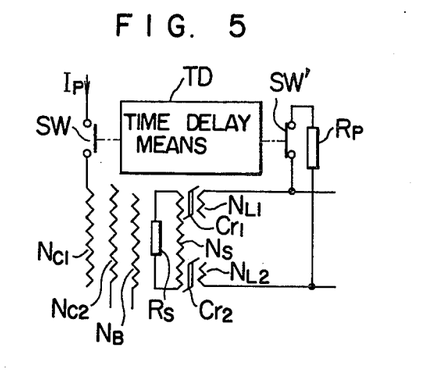
FIGS. 5 and 6 show modifications of the embodiment shown in FIG. 3.

In the present embodiment, a time delay means TD may be added as shown in FIG. 5 so that a time delay occurs between the closure of the switch SW and the open of the switch SW'. If the switch SW' itself includes a time delay, e.g. when the switch SW is a relay contact, the time delay means TD need not be provided.

Where the above configuration is designed such that the above time delay is longer than the dead time required for passing through the boundary point C, it is possible to suppress the characteristic of the magnetic phase shifter MPS to a sufficiently low amplification degree on the curve II of FIG. 4 until the boundary point C is passed, so that the dead time is further decreased.

In the embodiment of FIG. 3, the biasing winding $N_B$ may be omitted. In this case, if the resistance of the resistor $R_p$ is selected to be sufficiently small so that the amplification degree of the magnetic phase shifter MPS during the closure of the switch SW' is sufficiently lowered as shown by the curve II of FIG. 4, the output of the magnetic phase shifter MPS when neither target current $I_p$ nor braking current $I_M$ is applied thereto, that is, the magnitude at point E' can be suppressed to substantially zero while maintaining the output of the magnetic phase shifter MPS in the normal amplification region.

Then, when the switch SW is closed to supply the target current $I_p$ and the switch SW' is opened, the characteristic of the magnetic phase shifter MPS moves from the curves II to I of FIG. 4 in a manner similar to that explained in FIG. 3, and the automatic control of the braking current $I_M$ is thereafter attained in a manner similar to that shown in FIG. 2.

In this case, since the operating point of the magnetic phase shifter MPS is in the normal amplification region from the beginning, it is not necessary to pass through the boundary point C between the remanent output region and the normal amplification region and no dead time therefore occurs.

In the configuration of FIG. 1, it may be considered to adjust the biasing current $I_B$ such that the initial operating point is established in the normal amplification region just beyond the boundary point C, the operating point is apt to change considerably as shown by the dot and dash lines in FIG. 2 by the changes in the power supply voltage and the surrounding temperature particularly when the amplification degree of the magnetic phase shifter MPS is high as shown in FIG. 2. As a result, the operating point may shift into the remanent output region or an unduly large output may be produced when no target current $I_p$ is applied, blocking smooth control.

In the present embodiment, since the amplification factor of the magnetic phase shifter MPS is sufficiently low, the output at the point E' in FIG. 4 is very stable. Even if the point E' moves into the remanent output region, it would be the same as in the case of FIG. 3 where the operating point is established in the remanent output region by the biasing input, and the dead time in passing through the boundary point C is sufficiently small as described above. Therefore, much more smooth control than in the prior art system can be attained.

In this manner, by omitting the biasing winding $N_B$, the construction of the magnetic phase shifter can be simplified and the bias power supply $E_B$ can be eliminated and hence a simpler and cheaper system can be provided.

Figure 6:
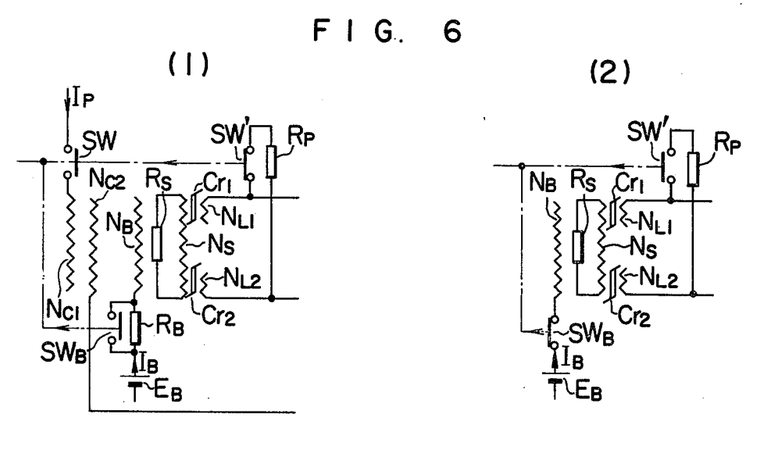

In the embodiment of FIG. 3, as shown in FIG. 6 (1), a parallel circuit of a resistor $R_B$ and a switch $SW_B$ which is operated in opposite phase to the switch SW' and linked to the switch SW' may be inserted in the circuit of the biasing current $I_B$ to lower the amplification degree of the magnetic phase shifter MPS as well as the biasing current $I_B$ while the operating point of the magnetic phase shifter MPS before the target current $I_p$ is supplied is established in the normal amplification region just beyond the boundary point C. In this case, the dead time can also be nullified as in the case where the biasing winding $N_B$ is omitted.

Alternatively, as shown in FIG. 6 (2), the switch which is in phase with the switch SW' may be inserted in series with the biasing winding $N_B$ such that a biasing current to bring the operating point in the normal amplification region just beyond the boundary point C is supplied to the magnetic phase shifter MPS during the closure of the switch SW'. In this manner, the dead time can also be nullified.

According to the above methods, since the operating point can be established by both the resistor $R_p$ and the biasing current $I_B$, the freedom of adjustment can be enlarged.

As stated above, since the magnetic phase shifter generally has the characteristic as shown by the curve I in FIGS. 2 and 4, the output of the magnetic phase shifter is approximately maximum even at zero control input and this is generally an inconvenient characteristic. Viewing differently, it may be considered that a control input corresponding to O-C on the curve I in FIGS. 2 and 4 has been previously applied to the magnetic phase shifter.

Accordingly, in the embodiment of FIG. 3, when no bias is applied, it may be considered that a target current input corresponding to O-C on the curve I in FIGS. 2 and 4 has been previously applied when no target current $I_p$ is externally applied. Since the braking current $I_M$ is controlled to be substantially equal to the above value, this method may be sufficient for practical use if highly accurate control of the braking current $I_M$ is not required. In this case, when it is required to change the magnitude of the braking current $I_M$, the number of turns of the control winding $N_{c2}$ or the output level of the D.C. current transformer DCCT may be changed.

In this manner, in FIG. 3, the biasing winding $N_B$ and the bias voltage supply $E_B$ as well as the target current $I_p$, the switch SW and the control winding $N_{c1}$ can be omitted so that the system is very much simplified. In this case, the switch SW' may be so designed that it opens when the braking current $I_M$ is to flow and closed when the braking current is to be suppressed.

Figure 7:
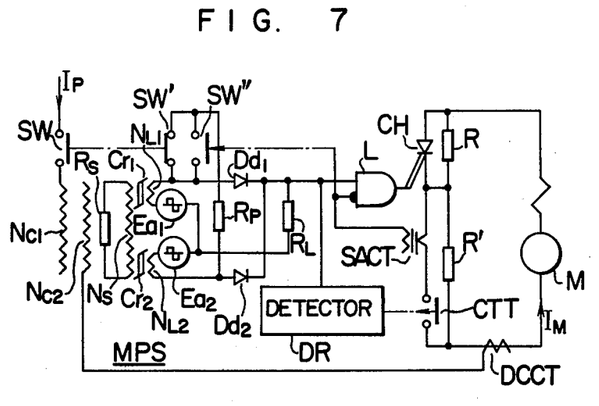
FIG. 7 shows a configuration of another embodiment of the present invention.

FIG. 7 shows another embodiment of the present invention in which the present invention is applied to another form of braking current control system. In FIG. 7, the like characters to those in FIG. 3 represent the like parts. CTT denotes a contactor connected in parallel with the resistor R' through a primary winding of a saturable current transformer SACT, and DR denotes a detector which detects when an output duty factor of the magnetic phase shifter MPS reaches a maximum and stores the maximum value. The contactor CTT is driven by an output of the detector DR. An output of a secondary winding of the current transformer SACT drives a switch SW''' connected in parallel with the switch SW' and applies an inhibit signal to a logical gate L which gates the output of the magnetic phase shifter MPS to the gate of the chopper CH.

In the above configuration, when the contactor CTT is open, the resistor R' is not shorted by the contactor CTT and the switch SW''' is open because no output is produced from the secondary winding of the saturable current transformer SACT. Therefore, the output of the magnetic phase shifter MPS is applied to the gate of the chopper CH through the logical gate L. Accordingly, through the control operation similar to that of the embodiment shown in FIG. 3, the braking current $I_M$ is controlled to be equal to the target current $I_p$.

When the braking current $I_M$ flows to impart a braking torque to the main motor M, a velocity of which is thereby reduced, the braking current $I_M$ which has been initially flowing by the voltage generated by the main motor M also tends to decrease. Thus, the output duty factor of the magnetic phase shifter MPS increases to suppress the reduction of the braking current $I_M$. As a result, the duty factor of the chopper CH also increases and the equivalent parallel resistance of the resistor R and the chopper CH decreases to suppress the reduction of the braking current $I_M$.

Figure 8:
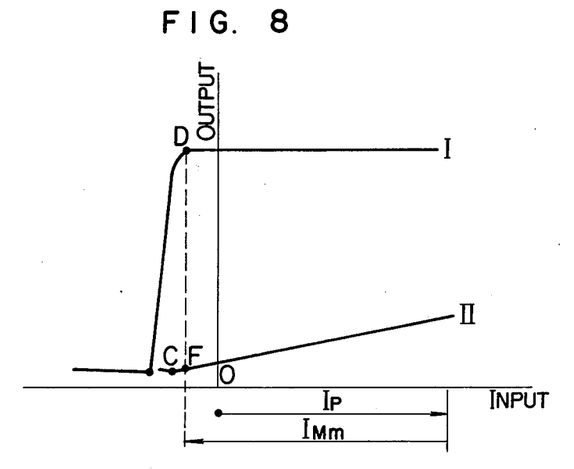
FIG. 8 illustrates the characteristic of the magnetic phase shifter used in the configuration shown in FIG. 7.

In this manner, as the speed of the main motor M continues to be decreased while the braking current $I_M$ is maintained at substantially constant, the output duty factor of the magnetic phase shifter MPS reaches a maximum as shown by a point D in FIG. 8 and it is no longer possible to continue to control the braking current $I_M$ at the constant value. The braking current $I_M$ at this point is designated $I_{Mm}$ as shown in FIG. 8.

In order to further continue the constant control of the braking current $I_M$, the detector DR detects when the output duty factor of the magnetic phase shifter MPS reaches the maximum to close the contactor CTT. Thus, the braking current $I_{Mm}$ which has been flowing through the resitor R' flows into the contactor CTT through the primary winding of the saturable current transformer SACT so that the resistor R' is shorted. Because the secondary winding of the saturable current transformer SACT produces a pulse output, which is applied to the logical gate L to apply the inhibit signal thereto during the duration of the output pulse, the duty factor of the chopper CH is zero during that period. If the resistance of the resistor R is selected to be equal to the sum of the resistor R' and the equivalent parallel resistance of the resistor R and the chopper CH when the duty factor of the chopper CH is maximum, the braking current $I_{Mm}$ does not change even when the resistor R' is shorted by the contactor CTT and the duty factor of the chopper CH changes to zero. Since the switch SW''' is closed by the pulse output of the saturable current transformer SACT, the resistor $R_p$ is connected across the rectifiers $D_{d1}$ and $D_{d2}$ and the magnetic phase shifter MPS exhibits a sufficiently low amplification degree such as shown by the curve II in FIG. 8 so that the output is suppressed. In this case, as is also shown in FIG. 4, the operating point of the magnetic phase shifter MPS can be brought in the normal amplification region as shown by a point F on the curve II in FIG. 8 by properly adjusting the resistance of the resistor $R_p$.

Accordingly, when the pulse output of the saturable current transformer SACT terminates and the switch SW''' is opened to shift the characteristic of the magnetic phase shifter MPS from the curve II back to the curve I in FIG. 8, there occurs no dead time, which occurs when the operating point moves from the remanent output region to the normal amplification region. Further, even if the point F on the curve II of FIG. 8 moves into the remanent output region by the variation of the characteristic of the components or the like, the dead time will be sufficiently small because the amplification degree on the curve II of FIG. 8 is sufficiently low as described in connection with the embodiment of FIG. 3.

Thus, according to the present embodiment, when the output of the saturable current transformer SACT terminates, the output of the magnetic phase shifter MPS appears without substantial delay, which output is applied to the gate of the chopper CH to effect the constant control of the braking current $I_M$.

Figure 9:
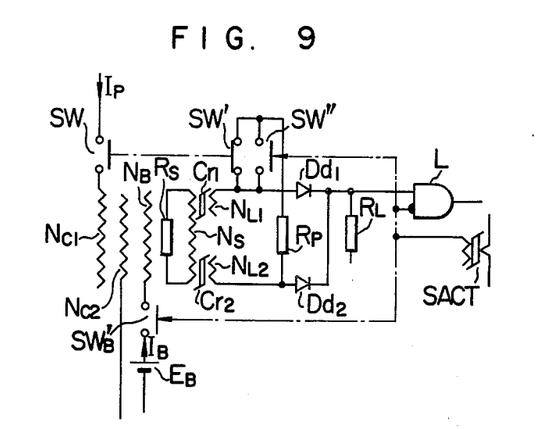
FIG. 9 shows a modification of the embodiment shown in FIG. 7.

In the present embodiment, as shown in FIG. 9, a pulsing bias current $I_B$ may be supplied to the biasing winding $N_B$ of the magnetic phase shifter MPS through a switch $SW_B'$ which is actuated by the output of the saturable current transformer SACT.

In this arrangement, when the output of the saturable current transformer SACT is produced, the suppression of the output of the magnetic phase shifter MPS is effected in shorter time by the reduction of the amplification degree due to the closure of the switch SW″ and the biasing effect due to the closure of the switch $SW_B'$. Accordingly, the output pulse width of the saturable current transformer SACT may be narrower and hence the constant control of the braking current can be recovered faster enabling smoother control.

Figure 10:
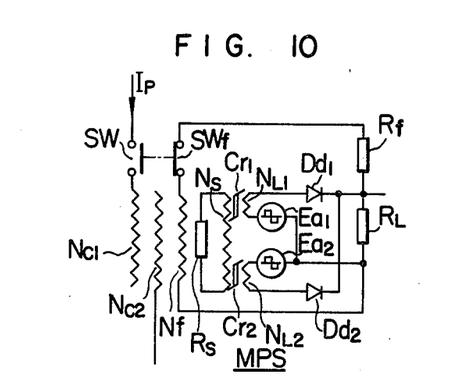
FIGS. 10 to 13 illustrate other embodiments of the present invention.

In the embodiments described above, in order to reduce the amplification degree of the magnetic phase shifter MPS to suppress the output thereof, the resistor $R_p$ is provided across the rectifiers $D_{d1}$ and $D_{d2}$. A negative feedback winding $N_f$ may alternatively be provided as shown in FIG. 10 and a voltage across the load resistor $R_L$ may be applied to the feedback winding $N_f$ through a feedback resistor $R_f$ and a switch $SW_f$.

In the arrangement in which the winding $N_f$ is not provided such as in FIG. 3, when the resistance of the resistor $R_p$ is reduced to sufficiently lower the amplification degree, the currents flowing from the A.C. power supplies $E_{a1}$ and $E_{a2}$ increase considerably and hence the capacities of the components must be high accordingly. In the embodiment of FIG. 10, the above drawback can be resolved because the amplification degree can be sufficiently lowered by increasing the number of turns of the winding $N_f$.

Figure 11:
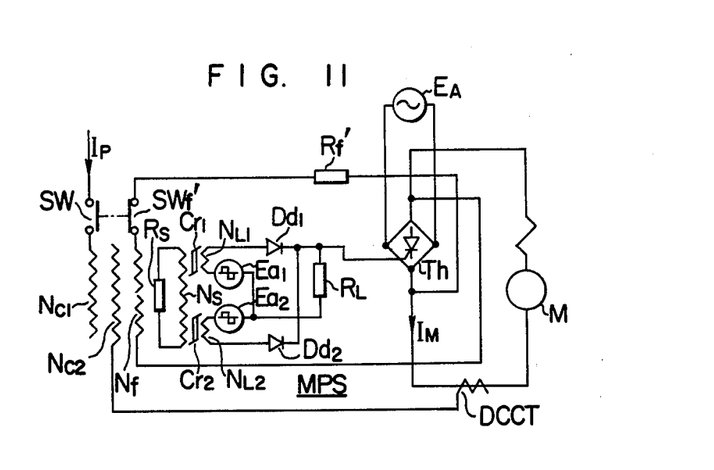

While the embodiments described above control the dynamic braking current $I_M$ by the chopper CH, the present invention may be applied to a control system for controlling the current $I_M$ of the main motor M by phase control of the A.C. in which the output of the magnetic phase shifter MPS is applied to a gate of a thyristor Th connected to an A.C. power supply $E_A$, as shown in FIG. 11.

The control operation for the current $I_M$ in this case is similar to that in FIG. 3 and smooth control with small dead time can be attained. Although the resistor $R_p$ may be connected across the rectifiers $D_{d1}$ and $D_{d2}$ like in FIG. 3 in order to reduce the amplification degree of the magnetic phase shifter MPS, the output voltage of the thyristor Th is applied to the feedback winding $N_f$ through a resistor $R_f'$ and a switch $SW_f'$ in the embodiment of FIG. 11.

With this arrangement, since the output voltage of the thyristor Th approximates the output voltage of the magnetic phase shifter MPS and is higher than the latter, the same negative feedback action is attained and the smaller number of turns of the winding $N_f$ than that in the embodiment of FIG. 10 may be used.

While the embodiments described above effect the phase control of the thyristor Th or the chopper CH in synchronism with the output phase of the magnetic phase shifter MPS, the magnetic phase shifter MPS may be used as a usual magnetic amplifier which produces a mean value of the output because the magnetic phase shifter inherently consists of the magnetic amplifier per se, and another phase shifter using a unijunction transistor or the like may be driven by the mean output in order to effect the phase control of the chopper or the thyristor. It is apparent that similar effect is obtainable when the present invention is applied to such an environment.

Figure 12:
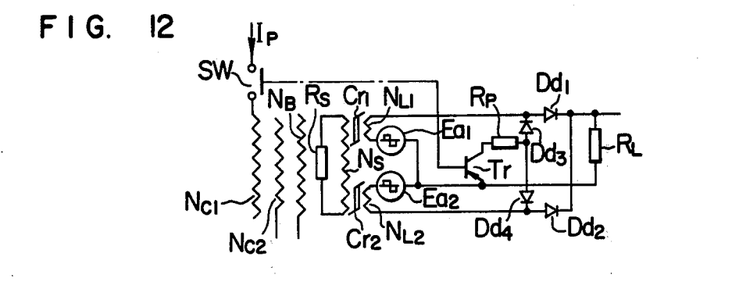

While the embodiments described above use the contact as the switches SW' etc. for suppressing the output of the magnetic phase shifter MPS, the contact SW' in FIG. 3, for example, may be substituted by a transistor switch $T_r$, as shown in FIG. 12. In FIG. 12, $D_{d3}$ and $D_{d4}$ denote backcurrent blocking rectifiers.

In this arrangement, when a base input is applied to the transistor switch $T_r$ simultaneously with the actuation of the switch SW to render the transistor switch $T_r$ conductive, the resistor $R_p$ is connected in parallel with the rectifiers $D_{d1}$ and $D_{d2}$ in backward polarity thereto and hence the amplification degree of the magnetic phase shifter MPS is lowered. In this embodiment, the problem of the wear of the contacts and poor contact thereof is eliminated and highly reliable control operation is attained.

Figure 13:
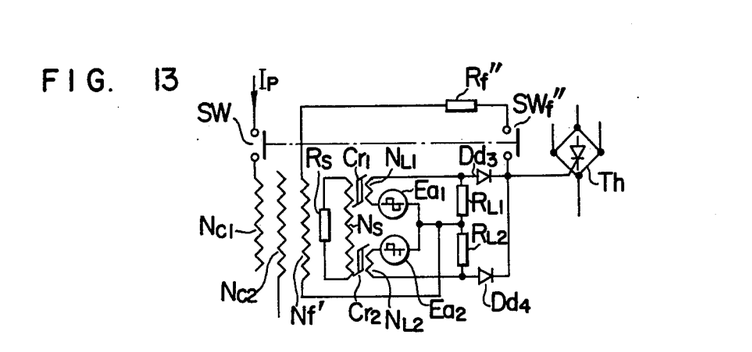

In the embodiments described above, the amplification degree of the magnetic phase shifter MPS in the normal amplification region is sufficiently high and it is lowered by applying the negative feedback when it is desired to suppress the output. However, as shown in another embodiment of FIG. 13, the amplification degree of the magnetic phase shifter MPS in the normal amplification region may be set to be sufficiently low and a positive feedback may be applied to sufficiently increase the amplification degree when it is not desired to suppress the output. Namely, as shown in FIG. 13, unlike the embodiment of FIG. 11, load resistors $R_{L1}$ and $R_{L2}$ are connected to the output windings $N_{L1}$ and $N_{L2}$ of the magnetic phase shifter MPS without routing the feedback rectifiers, and the voltages across the load resistors $R_{L1}$ and $R_{L2}$ are combined by the rectifiers $D_{d3}$ and $D_{d4}$ for the application to the thyristor Th. The output voltage of the magnetic phase shifter MPS combined by the rectifiers $D_{d3}$ and $D_{d4}$ is applied to a positive feedback winding $N_f'$ through a positive feedback resistor $R_f''$ and a switch $SW_f''$ interlocked with the switch SW.

In this configuration, when the switch SW is opened and the target current $I_p$ is not supplied, the switch $SW_1$ is also opened and the magnetic phase shifter MPS is in a sufficiently low amplification degree condition as shown by the curve II in FIG. 4, but when the switch SW is closed and the target current $I_p$ is applied, the switch $SW_1$ is also closed and the magnetic phase shifter MPS exhibits a sufficiently high amplification degree condition as shown by the curve I in FIG. 4.

In the present embodiment, since the amplification degree of the magnetic phase shifter MPS is increased only after the switch $SW_1$ has been closed, when poor contact of the switch occurs as is often seen in this type of switch, the amplification degree of the magnetic phase shifter MPS remains at its low state and hence the output of the thyristor Th also remains at its low state. Therefore, a fail-safe operation can be attained.

In the control systems shown in FIGS. 1, 3 and 7, when a braking force exceeds a limit of adhesive force of the electrical vehicle, the wheels glide and the speed of the vehicle is not decreased. This is not only dangerous but also causes damage to the wheels and the rails. In such a case, it is necessary to reduce the braking current $I_M$ by temporarily reducing the target current $I_p$ to zero in order to recover the adhesive force of the wheels. In this case, it is desirable to reduce the output of the magnetic phase shifter MPS as fast as possible.

Furthermore, in the system shown in FIG. 11 wherein the current $I_M$ is controlled during the acceleration of the main motor M as well, if the acceleration force exceeds the limit of the adhesive force, racing of the wheels occurs. This not only prevents the acceleration of the vehicle but also causes the damage to the wheels and the rails. Accordingly, again it is necessary to reduce the output of the magnetic phase shifter MPS as fast as possible to recover the adhesive force.

Furthermore, in the embodiment of FIG. 11, similar rapid reduction of the output is necessary when the current $I_M$ increases too much by sudden rise of the A.C. power supply $E_A$ to cause the damage of the thyristor Th or the motor M.

In such cases, the present invention can provide superior characteristic to the prior art system. In the prior art system shown in FIG. 1, a response time constant of the braking current $I_M$ when the target current $I_p$ is changed stepwise is generally expressed by $T/(1+K)$ as is known in the automatic control theory, where K is a loop gain and T is a time constant of the magnetic phase shifter MPS. Accordingly, when the target current $I_p$ is reduced to zero in order to reduce the braking current, the response occurs with the time constant shown above.

On the other hand, in the embodiments of the present invention, since the output of the magnetic phase shifter MPS is negatively fed back when the output is to be reduced, the loop gain of the control system increases accordingly and hence the magnitude of $T/(1+K)$ is smaller than in the prior art system. Therefore, the output can be reduced faster.

Furthermore, in the control systems shown in FIGS. 1, 3 and 7, a so-called idling notch test, that is, a test in which the chopper CH is operated while the braking current circuit is opened so that no braking current $I_M$ flows, is required in order to check the operation of the control system. In such a case, the present operation can provide faster operation than the prior art system.

More particularly, in the prior art system shown in FIG. 1, the loop gain is zero because no braking current $I_M$ flows, and hence the operation time constant of the chopper CH when the target current $I_p$ is changed stepwise is equal to the time constant of the magnetic phase shifter MPS, that is, approximately equal to T. Since the T is set to a large value in order to control the braking current $I_M$ in a stable manner as described above, longer time is required for the idling notch test.

On the other hand, in the embodiments of the present invention, since the negative feedback is applied to the magnetic phase shifter MPS when the target current $I_p$ is reduced to zero, the operation time constant of the magnetic phase shifter MPS and hence of the chopper CH changes to $T/(1+K')$, when K' is a loop gain of the negative feedback loop. Thus, the idling notch test can be performed in shorter time than the prior art system.

As described hereinabove in conjunction with the preferred embodiments, the present invention provides a magnetic phase shifter control system which includes no or sufficiently small dead time if any and enables rapid reduction of the output. Accordingly, the present system is suitable for attaining smooth automatic control and advantageous in industrial use.

We claim:

1. A magnetic phase shifter control system comprising a magnetic phase shifter with a predetermined amplification degree, said magnetic phase shifter including a saturable core, an output winding coupled magnetically to said saturable core for producing an output signal in accordance with said amplification degree, and an A.C. power supply for exciting said output winding, a first means for suppressing the output signal of said magnetic phase shifter to a level lower than a predetermined level, and a second means for changing the amplification degree of said magnetic phase shifter when said first means is operative.

2. A magnetic phase shifter control system according to claim 1, wherein said magnetic phase shifter includes a control winding which is wound on said saturable core and to which a control command is applied, said output signal being produced in accordance with said control command.

3. A magnetic phase shifter control system according to claim 1, wherein said magnetic phase shifter includes a control winding which is wound on said saturable core and to which a control command is applied, said output signal being produced in accordance with said control command, and a shorting winding wound on said saturable core.

4. A magnetic phase shifter control system according to claim 1, wherein said magnetic phase shifter includes a control winding which is wound on said saturable core and to which a control command is applied, said output signal being produced in accordance with said control command, and a bias winding wound on said saturable core.

5. A magnetic phase shifter control system according to claim 1, wherein said magnetic phase shifter includes a control winding which is wound on said saturable core and to which a control command is applied, said output signal being produced in accordance with said control command, and said first means includes a device for reducing said control command to zero.

6. A magnetic phase shifter control system according to claim 1, wherein said first means includes a first circuit which is operative when the output of said magnetic phase shifter reaches a maximum and a second circuit which blocks the output of said magnetic phase shifter when said first circuit is operative.

7. A magnetic phase shifter control system according to claim 1, wherein said second means acts to lower the amplification degree of said magnetic phase shifter when said first means is operative and raise the amplification degree of said magnetic phase shifter to a predetermined level when said first means is reset.

8. A magnetic phase shifter control system according to claim 1, wherein said second means acts to lower the amplification degree of said magnetic phase shifter when said first means is operative and raise the amplification degree of said magnetic phase shifter to a predetermined level a predetermined time interval after said first means has been reset.

9. A magnetic phase shifter control system according to claim 1, wherein said second means includes a third circuit for applying a negative feedback to said magnetic phase shifter when said first means is operative.

10. A magnetic phase shifter control system according to claim 9, wherein said third circuit includes a device which is rendered conductive when said first means is operative and an element for applying the negative feedback to said magnetic phase shifter when said device is conducting.

11. A magnetic phase shifter control system according to claim 10, wherein said element comprises a feedback winding for negatively feeding the output signal of said magnetic phase shifter back to said magnetic phase shifter.

12. A magnetic phase shifter control system according to claim 1, wherein said magnetic phase shifter includes a control winding which is wound on said saturable core and to which a control command is applied, said output signal being produced in accordance with said control command, an A.C. winding as said A.C. power supply for exciting said output winding, and a bias winding wound on said saturable core, and said second means includes a third circuit for applying a negative feedback to said magnetic phase shifter when said first means is operative and a fourth circuit for changing the amount of bias applied to said bias winding when said third circuit applies the negative feedback to said magnetic phase shifter.

13. A magnetic phase shifter control system according to claim 12, wherein said fourth circuit acts to supply a predetermined amount of bias to said bias winding when said third circuit applies no negative feedback to said magnetic phase shifter and reduce the amount of bias when the negative feedback is applied.

14. A magnetic phase shifter control system according to claim 12, wherein said fourth circuit acts to supply a predetermined amount of bias to said bias winding only when said third circuit applies the negative feedback to said magnetic phase shifter.

15. A magnetic phase shifter control system according to claim 2, wherein the magnetic phase shifter has a remanent output region of operation wherein the control command is zero and the magnetic phase shifter produces a low output current, and a normal output region wherein the control command is applied and an output current greater than the low output current in said remanent output region is produced, and further wherein said first means switches said magnetic phase shifter between said remanent output region and said normal output region, and said second means lowers the amplification degree of said magnetic phase shifter when it is in said remanent output region and raises the amplification degree of said magnetic phase shifter to a predetermined level when it is in said normal operation region so that a delay of operation in the process of switching between the remanent range of operation and the normal range of operation causes said degree of amplification of said magnetic phase shifter to still be low as the magnetic phase shifter crosses a transition point from the remanent region to the normal region.

16. A magnetic phase shifter control system comprising a saturable core, a control winding which is wound on said saturable core and to which a control command is applied, and A.C. power supply, an output winding which is wound on said saturable core and adapted to be excited by said A.C. power supply to produce a signal having a phase determined by said control command during a positive half cycle of said A.C. power supply, an object to be controlled by a signal corresponding to the output of said output winding, a first feedback winding wound on said saturable core for negatively feeding back an output of said object, a device which is rendered conductive when the control command applied to said control winding is zero, and an element connected in series with said device for passing a current from said A.C. power supply to said output winding during a negative half cycle of said A.C. power supply.

17. A magnetic phase shifter control system comprising a saturable core, a control winding which is wound on said saturable core and to which a control command is applied, an output winding which is wound on said saturable core and produces a signal in accordance with said control command, an A.C. power supply for exciting said output winding, an object to be controlled by a signal corresponding to the output of said output winding, a first feedback winding wound on said saturable core for negatively feeding back an output of said object, a device adapted to be rendered conductive when the control command applied to said control winding is zero, and a second feedback winding wound on said saturable core and connected in series with said device for negatively feeding back a signal corresponding to the output signal of said output winding.

* * * * *